(12) United States Patent
Taira

(10) Patent No.: US 9,964,953 B2
(45) Date of Patent: May 8, 2018

(54) AUTONOMOUS MOVING OBJECT

(71) Applicant: TOYOTA JIDOSHA KABUSHIKI KAISHA, Toyota-shi (JP)

(72) Inventor: Tetsuya Taira, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 24 days.

(21) Appl. No.: 15/100,156

(22) PCT Filed: Nov. 24, 2014

(86) PCT No.: PCT/IB2014/002549
§ 371 (c)(1),
(2) Date: May 27, 2016

(87) PCT Pub. No.: WO2015/079300
PCT Pub. Date: Jun. 4, 2015

(65) Prior Publication Data
US 2017/0023943 A1 Jan. 26, 2017

(30) Foreign Application Priority Data
Nov. 28, 2013 (JP) .................................. 2013-246018

(51) Int. Cl.
*G05D 1/02* (2006.01)
*G01S 13/87* (2006.01)
(Continued)

(52) U.S. Cl.
CPC .............. *G05D 1/0212* (2013.01); *G01S 7/40* (2013.01); *G01S 7/4026* (2013.01); *G01S 7/497* (2013.01);
(Continued)

(58) Field of Classification Search
CPC ................ G05D 1/0212; G05D 1/024; G05D 2201/0217; G01S 7/40; G01S 7/4026; G01S 7/497; G01S 7/4972; G01S 7/52004; G01S 13/86; G01S 13/87; G01S 13/881; G01S 13/931; G01S 15/87; G01S 15/931;
(Continued)

(56) References Cited

FOREIGN PATENT DOCUMENTS

| JP | 2007-34769 A | 2/2007 |
| JP | 2012-130781 A | 7/2012 |

OTHER PUBLICATIONS

International Search Report dated May 8, 2015 in PCT/IB2014/002549 Filed Nov. 24, 2014.

*Primary Examiner* — Jerrah Edwards
*Assistant Examiner* — Mathew Franklin Gordon
(74) *Attorney, Agent, or Firm* — Oblon, McClelland, Maier & Neustadt, L.L.P.

(57) ABSTRACT

An autonomous moving object includes: at least one distance sensor configured to detect distances to first and second positions located in a moving direction of the autonomous moving object on a road surface; and a determination unit configured to calculate a difference between a differential time between a time when the distance value to the first position detected by the at least one distance sensor is greater than a first threshold value and a time when the distance value to the second position is greater than a second threshold value and a moving time in which the autonomous moving object moves between the first and second positions and to determine that the distance sensor is abnormal only when the calculated difference is equal to or greater than a predetermined value.

16 Claims, 10 Drawing Sheets

(51) Int. Cl.
  *G01S 13/93* (2006.01)
  *G01S 17/87* (2006.01)
  *G01S 17/93* (2006.01)
  *G01S 15/93* (2006.01)
  *G01S 13/88* (2006.01)
  *G01S 15/87* (2006.01)
  *G01S 13/86* (2006.01)
  *G01S 7/40* (2006.01)
  *G01S 7/497* (2006.01)
  *G01S 7/52* (2006.01)

(52) U.S. Cl.
  CPC ........ *G01S 7/4972* (2013.01); *G01S 7/52004* (2013.01); *G01S 13/86* (2013.01); *G01S 13/87* (2013.01); *G01S 13/881* (2013.01); *G01S 13/931* (2013.01); *G01S 15/87* (2013.01); *G01S 15/931* (2013.01); *G01S 17/87* (2013.01); *G01S 17/936* (2013.01); *G05D 1/024* (2013.01); G01S 2007/4034 (2013.01); G01S 2007/52012 (2013.01); G01S 2013/9353 (2013.01); G01S 2013/9371 (2013.01); G01S 2015/939 (2013.01); G05D 2201/0217 (2013.01)

(58) Field of Classification Search
  CPC ................... G01S 17/87; G01S 17/936; G01S 2007/4034; G01S 2007/52012; G01S 2013/9353; G01S 2013/9371; G01S 2015/939
  See application file for complete search history.

AUTONOMOUS MOVING OBJECT

BACKGROUND OF THE INVENTION

1. Field of the Invention

The present invention relates to an autonomous moving object that autonomously moves.

2. Description of Related Art

An autonomous moving robot is known which includes a level difference sensor for detecting a level difference of a moving surface using an external information input unit and which autonomously moves (see Japanese Patent Application Publication No. 2007-034769 (JP 2007-034769 A)).

SUMMARY OF THE INVENTION

However, in the robot, for example, when the sensor loses functionality, there is a possibility that abnormality of the sensor will not be determined. The invention provides an autonomous moving object that can determine abnormality of a sensor with high accuracy.

An aspect of the invention relates to an autonomous moving object. The autonomous moving object includes: at least one distance sensor configured to detect distances to first and second positions located in a moving direction of the autonomous moving object on a road surface; and a determination unit configured to calculate a difference between a differential time between a time when the distance value to the first position detected by the at least one distance sensor is greater than a first threshold value and a time when the distance value to the second position is greater than a second threshold value and a moving time in which the autonomous moving object moves between the first and second positions and to determine that the distance sensor is abnormal when the calculated difference is equal to or greater than a predetermined value.

In the aspect, the at least one distance sensor may include a first distance sensor detecting the distance to the first position located in the moving direction of the autonomous moving object on the road surface and a second distance sensor detecting the distance to the second position on the road surface located closer to the autonomous moving object than the first position.

In the aspect, the autonomous moving object may further include a swing unit configured to swing the at least one distance sensor, and the at least one distance sensor may detect the distance to the first position on the road surface and the distance to the second position on the road surface located closer to the autonomous moving object than the first position when swinging.

In the aspect, the determination unit may be configured to calculate a first comparison value which is obtained by comparing the distance value to the first position detected by the at least one distance sensor with a preliminarily-calculated distance value to the first position and a second comparison value which is obtained by comparing the distance value to the second position detected by the at least one distance sensor with a preliminarily-calculated distance value to the second position, to calculate a differential time between a time when the first comparison value is greater than the first threshold value and a time when the second comparison value is greater than the second threshold value, and to determine whether the at least one distance sensor is abnormal based on the calculated differential time.

In the aspect, the at least one distance sensor may include a first distance sensor detecting the distance to the first position located in the moving direction of the autonomous moving object on the road surface, a second distance sensor detecting the distance to the second position on the road surface located closer to the autonomous moving object than the first position, and a third distance sensor detecting the distance to a third position on the road surface located closer to the autonomous moving object than the second position. The determination unit may be configured to calculate a differential time between a time when the distance value to the first position detected by the first distance sensor is greater than the first threshold value and a time when the distance value to the second position detected by the second distance sensor is greater than the second threshold value, to calculate a differential time between a time when the distance value to the third position detected by the third distance sensor is greater than a third threshold value and the time when the distance value to the second position detected by the second distance sensor is greater than the second threshold value, and to specify one out of the first to third distance sensors in which abnormality occurs based on the calculated differential times.

In the aspect, the at least one distance sensor may scan a road surface to detect distance values to a plurality of points on the road surface.

In the aspect, the autonomous moving object may further include a control unit configured to control movement of the autonomous moving object depending on the determination result of the determination unit.

In the aspect, the autonomous moving object may further include a warning unit configured to give a warning depending on the determination result of the determination unit.

Another aspect of the invention relates to a determination method of an autonomous moving object. The determination method of an autonomous moving object includes: detecting distances to first and second positions located in a moving direction of the autonomous moving object on a road surface through the use of a distance sensor; and calculating a difference between a differential time between a time when the detected distance value to the first position is greater than a first threshold value and a time when the distance value to the second position is greater than a second threshold value and a moving time in which the autonomous moving object moves between the first and second positions and determining that the distance sensor is abnormal when the calculated difference is equal to or greater than a predetermined value.

According to the aspects of the invention, it is possible to provide an autonomous moving object that can determine abnormality of a sensor with high accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
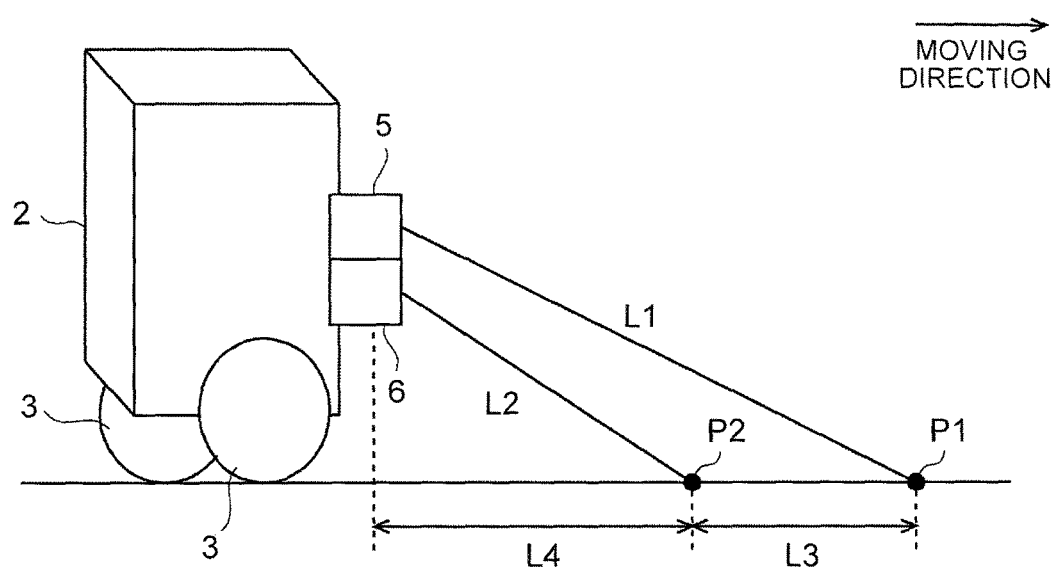
FIG. 1 is a perspective view schematically illustrating a configuration of an autonomous moving object according to an embodiment of the invention.
Figure 2:
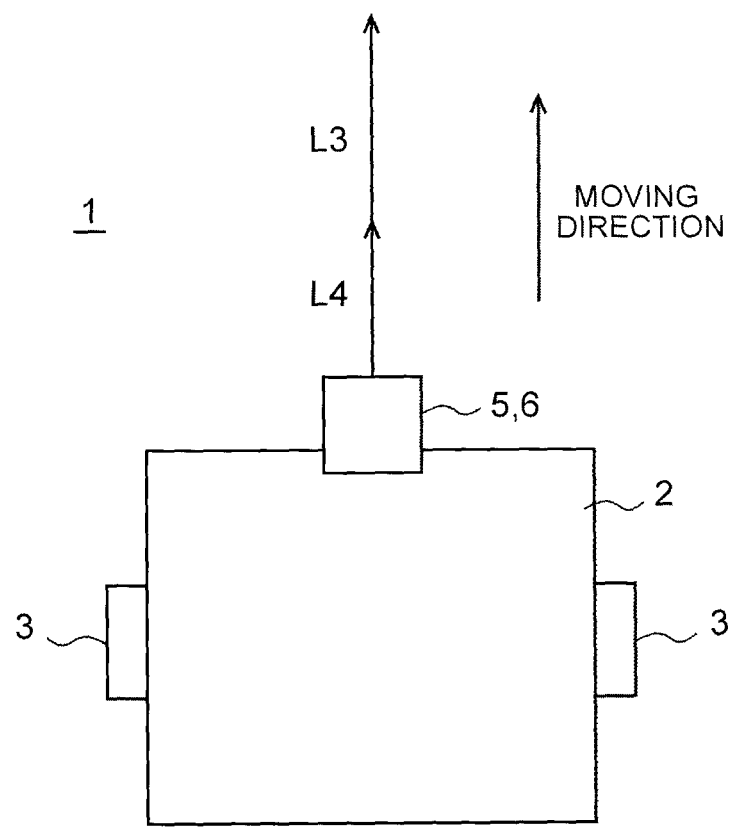
FIG. 2 is a top view of the autonomous moving object illustrated in FIG. 1 when viewed from the top side thereof.
Figure 3:
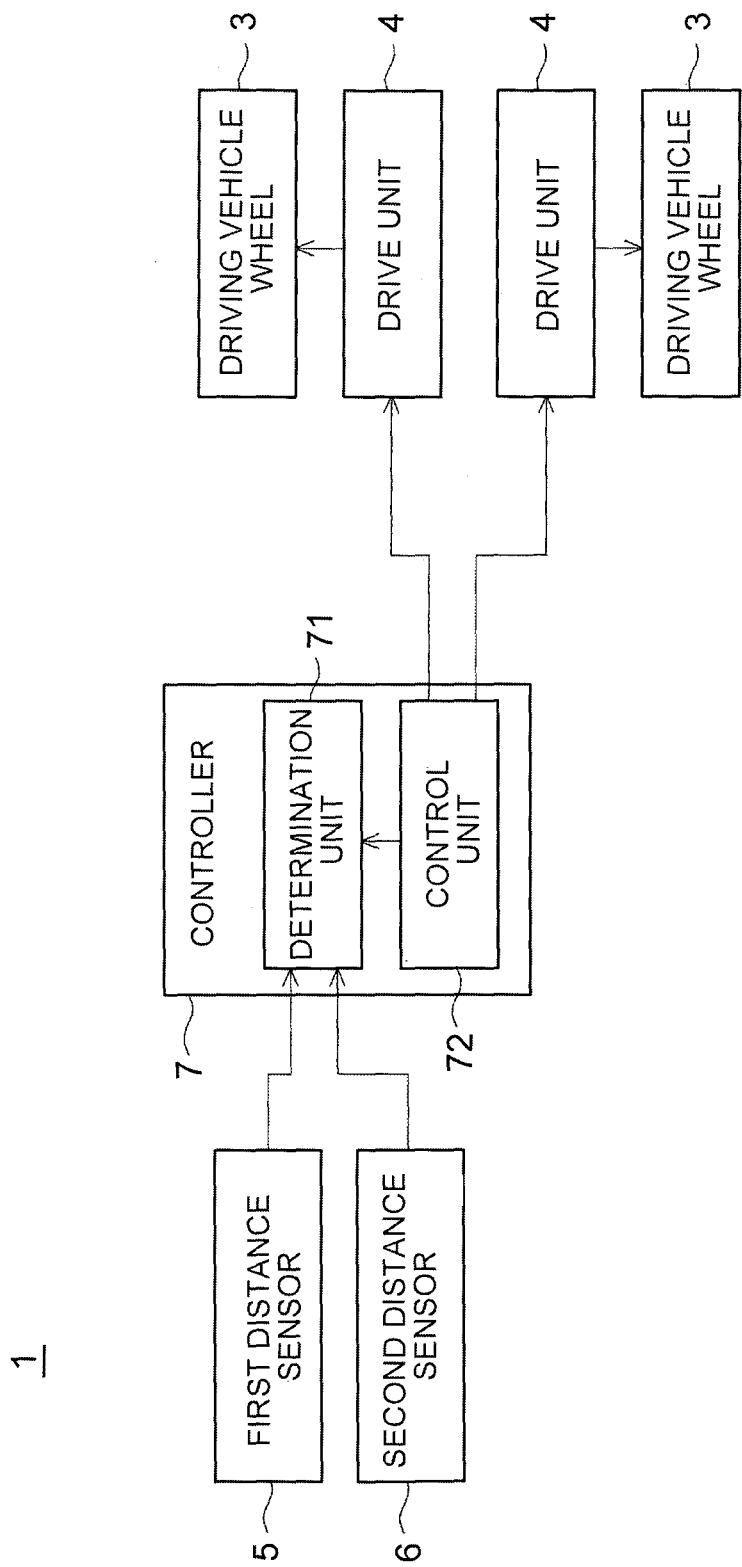
FIG. 3 is a block diagram schematically illustrating a system configuration of the autonomous moving object according to the embodiment of the invention.

Hereinafter, an embodiment of the invention will be described with reference to the accompanying drawings. FIG. 1 is a perspective view schematically illustrating a configuration of an autonomous moving object according to an embodiment of the invention. FIG. 2 is a top view of the autonomous moving object illustrated in FIG. 1 when viewed from the top side thereof. FIG. 3 is a block diagram schematically illustrating a system configuration of the autonomous moving object according to the embodiment of the invention.

An autonomous moving object 1 according to this embodiment includes a moving object body 2, a pair of right and left driving vehicle wheels 3 rotatably disposed in the moving object body 2, a drive unit 4 driving the driving vehicle wheels 3, first and second distance sensors 5, 6 acquiring distance information of an object in a moving environment, and a controller 7 controlling movement of the autonomous moving object 1.

The autonomous moving object 1 is constituted as a wheel-driven moving object as illustrated in FIG. 1, that autonomously moves, but is not limited thereto and may be constituted, for example, as a walking moving object such as a bipedal robot or may be an arbitrary moving object.

The drive unit 4 is mounted, for example, on the moving object body 2 and includes a motor, a drive circuit, and a reduction mechanism. The drive unit 4 rotationally drives the driving vehicle wheels 3 to cause the autonomous moving object 1 to move in response to the control signal from the controller 7.

The first and second distance sensors 5, 6 are constituted, for example, by a laser range finder, a millimeter wave radar sensor, an ultrasonic sensor, or a camera. The first and second distance sensors 5, 6 detect the distance values to a road surface on which the autonomous moving object 1 moves. The first and second distance sensors 5, 6 are the same measurement type of sensors. Accordingly, robustness to a measurement area thereof is improved. The first and second distance sensors 5, 6 may be different measurement types of sensors. For example, the first distance sensor 5 may be a laser range finder and the second distance sensor 6 may be an ultrasonic sensor. In this way, different measurement types of sensors may be combined. Accordingly, it is possible to secure a broader measurement area which cannot be processed by a single sensor.

The first distance sensor 5 is disposed above the second distance sensor 6 on the front side (in the moving direction) of the moving object body 2, but is not limited to the position and may be attached at any position of the moving object body 2. The first distance sensor 5 detects a distance value L1 to a first position P1 in the moving direction of the autonomous moving object 1 on a road surface. The second distance sensor 6 detects a distance value L2 to a second position P2 on the road surface which is closer to the autonomous moving object than the first position P1. The first and second distance sensors 5, 6 output the detected distance values L1, L2 to the first and second positions P1, P2 to the controller 7.

In a general autonomous moving object, even when abnormality occurs in a distance sensor, the abnormality of the distance sensor is not determined and there is a possibility that the autonomous moving object falls or drops, for example, due to a stepped part or an obstacle. On the contrary, the autonomous moving object 1 according to this embodiment includes the controller 7 for determining the abnormality of the first and second distance sensors 5, 6. Accordingly, it is possible to determine the abnormality of the first and second distance sensors 5, 6 with high accuracy while detecting a stepped portion or an obstacle. As a result, even when abnormality occurs in the first and second distance sensors 5, 6, it is possible to suppress a fall or a drop due to a stepped portion, an obstacle, or the like.

The controller 7 includes a determination unit 71 determining abnormality of the first and second distance sensors 5, 6 and a control unit 72 controlling the drive unit 4. The controller 7 is constituted by hardware such as a microcomputer including a central processing unit (CPU) performing a calculation process, a control process, and the like, a memory including a read only memory (ROM) or a random access memory (RAM) storing a calculation program, a control program, and the like which are executed by the CPU, and an interface unit (IF) inputting and outputting signals from and to the outside. The CPU, the memory, and the interface unit are connected to each other via a data bus or the like.

The determination unit 71 is a specific example of the determination unit and determines the abnormality of the first and second distance sensors 5, 6 on the basis of the distance values L1, L2 to the first and second positions P1, P2 detected by the first and second distance sensors 5, 6.

The determination unit 71 calculates a first comparison value which is obtained by comparing the distance value (hereinafter, referred to as measured distance value) L1 to the first position P1 output from the first distance sensor 5 with a distance value (hereinafter, referred to as calculated distance value) L1 to the first position P1 which was geometrically calculated in advance. Similarly, the determination unit 71 calculates a second comparison value which is obtained by comparing the measured distance value L2 to the second position P2 output from the second distance sensor 6 with a calculated distance value L2 to the second position P2 which was geometrically calculated in advance.

Here, the determination unit 71 geometrically calculates the calculated distance values L1, L2 to the first and second positions P1, P2 on the basis of attachment positions and sensor directions (attachment angles) of the first and second distance sensors 5, 6, for example, on the assumption that the road surface is a flat plane. The calculated distance values L1, L2 which are geometrically calculated, a distance L3 between the first and second positions P1, P2, and a distance L4 from a position obtained by projecting the first and second distance sensors 5, 6 onto the road surface to the second position P2 are values which are uniquely determined on the basis of the attachment positions and the sensor directions (attachment angles) of the first and second distance sensors 5, 6 and are constant.

The determination unit 71 calculates as the first comparison value a value (measured distance value/calculated distance value) which is obtained by dividing the measured distance value L1 to the first position P1 output from the first distance sensor 5 by the calculated distance value L1 to the first position P1 which is geometrically calculated in advance. Similarly, the determination unit 71 calculates as the second comparison value a value (measured distance value/calculated distance value) which is obtained by dividing the measured distance value L2 to the second position P2 output from the second distance sensor 6 by the calculated distance value L2 to the second position P2 which is geometrically calculated in advance.

The determination unit 71 determines abnormality of the first and second distance sensors 5, 6 on the basis of the calculated first and second comparison values. Here, it is assumed that the abnormality of the first and second distance sensors 5, 6 includes erroneous detection (abnormality in sensor value) of the first and second distance sensors 5, 6 as well as malfunction of the first and second distance sensors 5, 6. The determination unit 71 can determine the abnormality of the first and second distance sensors 5, 6 and can also determine presence of a stepped portion or an obstacle on a road surface.

(1) Stepped Portion Determining Method

When the autonomous moving object 1 moves on a flat plane and a stepped portion or an obstacle is not present at the first and second positions P1, P2 in the moving direction on which measurement is performed by the first and second distance sensors 5, 6, the measured distance values of the first and second distance sensors 5, 6 are constant values and thus the first and second comparison values are constant.

Figure 4:
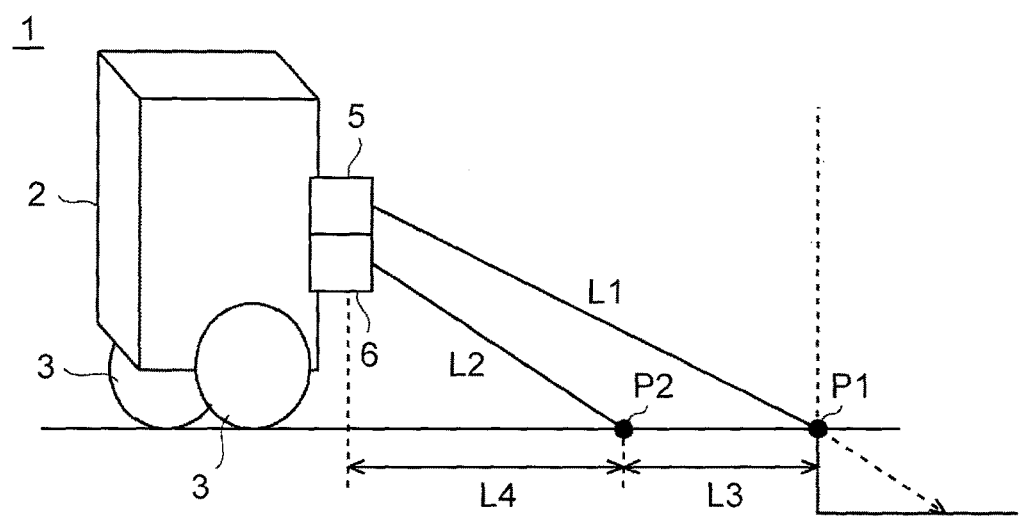
FIG. 4 is a diagram illustrating a stepped portion determining method according to the embodiment of the invention.
Figure 5:
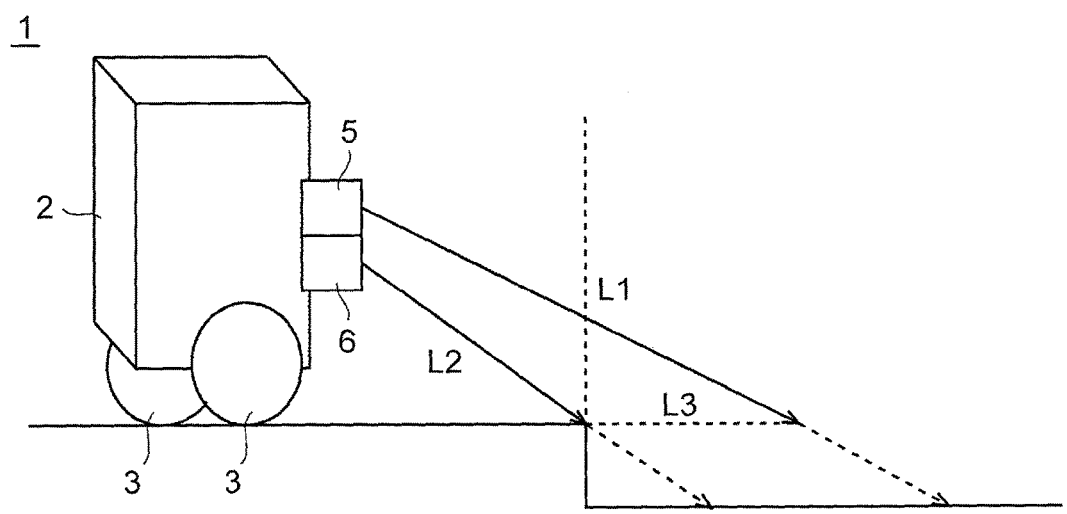
FIG. 5 is a diagram illustrating the stepped portion determining method according to the embodiment of the invention.

When a stepped portion is present on the road surface in the moving direction of the autonomous moving object 1 as illustrated in FIG. 4, the measured distance value L1 of the first distance sensor 5 first increases and thus the first comparison value also increases. Subsequently, when the autonomous moving object 1 moves by the distance L3 as illustrated in FIG. 5, the measured distance value L2 of the second distance sensor 6 increases and thus the second comparison value also increases and becomes equal to the first comparison value. Therefore, the determination unit 71 determines that a stepped portion is present when the first and second comparison values increase and first comparison value (t)=second comparison value (t+t3 (time in which the autonomous moving object 1 moves by the distance L3)) is established (elapsed time t>0). Here, t3 (time in which the autonomous moving object 1 moves by the distance L3) can be calculated, for example, by dividing the distance L3 between the first position P1 and the second position P2, which is calculated in advance, by the moving speed of the autonomous moving object 1.

(2) Obstacle Determining Method

Figure 6:
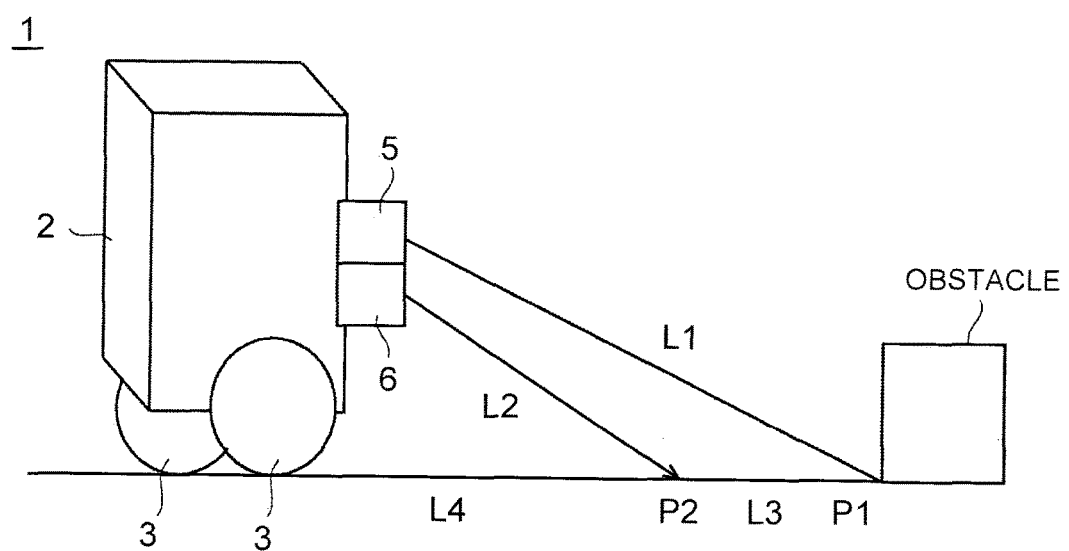
FIG. 6 is a diagram illustrating an obstacle determining method according to the embodiment of the invention.
Figure 7:
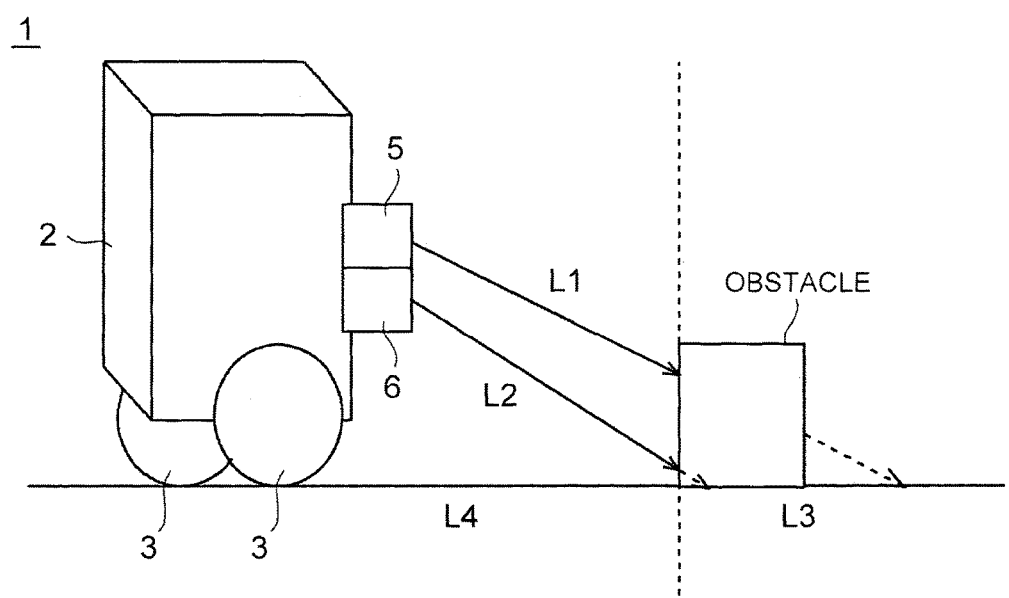
FIG. 7 is a diagram illustrating the obstacle determining method according to the embodiment of the invention.

When an obstacle is present on the road surface in the moving direction of the autonomous moving object 1 as illustrated in FIG. 6, the measured distance value L1 of the first distance sensor 5 first decreases and thus the first comparison value also decreases. When the autonomous moving object 1 moves by the distance L3 as illustrated in FIG. 7, the measured distance value L2 of the second distance sensor 6 decreases and thus the second comparison value also decreases and becomes equal to the first comparison value. Therefore, the determination unit 71 determines that an obstacle is present when the first and second comparison values decrease and first comparison value (t)=second comparison value (t+t3 (time in which the autonomous moving object 1 moves by the distance L3)) is established.

(3) Abnormality Determining Method for First and Second Distance Sensors

The determination unit 71 determines the abnormality of the first and second distance sensors 5, 6 by monitoring variations in the first and second comparison values. When the autonomous moving object 1 moves on a flat road surface, first comparison value (t)=constant value and second comparison value (t)=constant value are generally established.

Even when the autonomous moving object 1 moves on a flat road surface, the measured distance values of the first and second distance sensors 5, 6 vary, for example, due to a slight vibration error of the autonomous moving object 1 or a measurement error. Accordingly, in consideration of these errors, it can be determined that the autonomous moving object 1 moves on a flat road surface when the first comparison value (t) is less than a first threshold value and the second comparison value (t) is less than a second threshold value.

When the autonomous moving object 1 moves, for example, by the distance L3 and the first and second distance sensors 5, 6 are normal, first comparison value (t)=second comparison value (t+t3) is established. Accordingly, when this relationship is not established, it can be determined that at least one of the first and second distance sensors 5, 6 is abnormal.

Therefore, the determination unit 71 determines the abnormality of the first and second distance sensors 5, 6 on the basis of a differential time between the time when the first comparison value of the first distance sensor 5 is greater than the first threshold value and the time when the second comparison value of the second distance sensor 6 is greater than the second threshold value.

The determination unit 71 calculates, for example, the differential time between the time when the first comparison value of the first distance sensor 5 is greater than the first threshold value and the time when the second comparison value of the second distance sensor 6 is greater than the second threshold value. Then, the determination unit 71 determines that at least one of the first and second distance sensors 5, 6 is abnormal when the calculated differential time is equal to or greater than a predetermined value. As described in (1) and (2), even when the first and second comparison values vary due to a stepped portion or an obstacle, the differential time between the time when the first comparison value is greater than the first threshold value and the time when the second comparison value is greater than the second threshold value is equal to the time t3 in which the autonomous moving object 1 moves by L3. Accordingly, when the differential time is equal to or greater than the first predetermined value and increases, it can be determined that the measured distance value of at least one of the first and second distance sensors 5, 6 is abnormal.

The determination unit 71 may set values obtained by dividing the calculated distance values of the first and second distance sensors 5, 6 by the measured distance values or differential values between the calculated distance values of the first and second distance sensors 5, 6 and the measured distance values thereof as the first and second comparison values. The determination unit 71 may set the measured distance values of the first and second distance sensors 5, 6 as the first and second comparison values.

For example, the determination unit 71 calculates a differential time between the time when the measured distance value of the first distance sensor 5 is greater than the first threshold value and the time when the measured distance value of the second distance sensor 6 is greater than the second threshold value. Then, the determination unit 71 determines that at least one of the first and second distance sensors 5, 6 is abnormal when the calculated differential time is equal to or greater than a predetermined value. In this way, in the autonomous moving object 1 according to this embodiment, it is possible to determine the abnormality of the first and second distance sensors 5, 6 with high accuracy while detecting a stepped portion and an obstacle of a road surface.

The control unit 72 may control the drive unit 4 on the basis of the determination result of the determination unit 71. For example, when it is determined that a stepped portion or an obstacle is present in the moving direction, the determination unit 71 outputs the determination signal to the control unit 72. The control unit 72 controls the drive unit 4 so as to avoid (retreat from or pass by) the stepped portion or the obstacle in response to the determination signal from the determination unit 71. Accordingly, the autonomous moving object 1 can suppress a fall due to the stepped portion or a contact with the obstacle. The determination unit 71 may cause the autonomous moving object 1 to move on the stepped portion when it is determined that the stepped portion is small (for example, the increase in the first and second comparison values is equal to or less than a predetermined value).

The determination unit 71 may warn a user using a warning unit depending on the determination result. For example, when it is determined that a stepped portion or an obstacle is present in the moving direction, the determination unit 71 outputs the determination signal to the warning unit. The warning unit gives a warning (warning sound or warning light) to a user in response to the determination signal from the determination unit 71. The user can forcibly stop the autonomous moving object 1 or move the autonomous moving object 1 to a safe zone, for example, in response to the warning from the warning unit. Examples of the warning unit include a speaker outputting warning sound, a warning lamp emitting warning light or flickering, a display displaying a warning, and a communication unit remotely transmitting a warning signal by wireless communication or the like.

On the other hand, when it is determined that at least one of the first and second distance sensors 5, 6 is abnormal, the determination unit 71 outputs the determination signal to the warning unit. The warning unit gives a warning to a user in response to the determination signal from the determination unit 71. The user can immediately cope with the abnormality of the first and second distance sensors 5, 6 on the basis of the warning from the warning unit.

When the determination unit 71 determines that at least one of the first and second distance sensors 5, 6 is abnormal, the control unit 72 may control the drive unit 4 so as to cause the autonomous moving object 1 to perform a predetermined operation (repeated operation such as moving backward and then moving forward again). Accordingly, the determination unit 71 determines the abnormality of the first and second distance sensors 5, 6 again on the same condition as when the abnormality is determined. Therefore, when the first determination that the first and second distance sensors 5, 6 are abnormal is erroneous detection of the first and second distance sensors 5, 6, the second determination is changed to determination that the first and second distance sensors 5, 6 are normal. In this way, the abnormality determination of the first and second distance sensors 5, 6 can be determined to be the malfunction of the first and second distance sensors 5, 6 and the erroneous detection of the first and second distance sensors 5, 6.

When the determination unit 71 determines that at least one of the first and second distance sensors 5, 6 is abnormal and the abnormal distance sensor can be specified, the control unit 72 may continue to control the movement of the autonomous moving object 1 using the normal distance sensor on the basis of the determination result of the determination unit 71. In this case, the control unit 72 may perform a control of moving the autonomous moving object 1 to a predetermined location such as a charging station for charging the autonomous moving object 1. The determination unit 71 may give a warning for promoting the user to repair the distance sensor using the warning unit when the autonomous moving object 1 arrives at the predetermined location.

The method of determining abnormality of the first and second distance sensors in the autonomous moving object according to this embodiment will be described below in detail.

The determination unit 71 calculates the differential time between the time when the first comparison value of the first distance sensor 5 is greater than the first threshold value and the time when the second comparison value of the second distance sensor 6 is greater than the second threshold value (step S101).

The determination unit 71 calculates a difference between the calculated differential time and the movement time t3 in which the autonomous moving object 1 moves by the distance L3 (step S102). When the calculated difference is equal to or greater than a second predetermined value (YES in step S102), the determination unit 71 determines that at least one of the first and second distance sensors 5, 6 is abnormal (step S103).

On the other hand, when the calculated difference is less than the second predetermined value (NO in step S102), the determination unit 71 determines that the first and second distance sensors 5, 6 are normal (step S104). As described above, the autonomous moving object according to this embodiment includes the controller 7 determining the abnormality of the first and second distance sensors 5, 6. Accordingly, it is possible to determine the abnormality of the first and second distance sensors 5, 6 with high accuracy while detecting a stepped portion or an obstacle.

Figure 8:
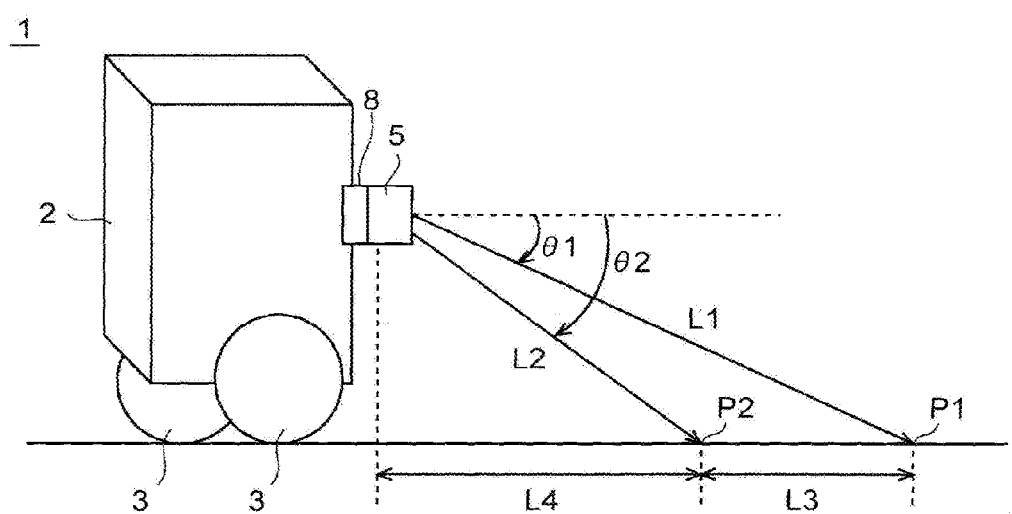
FIG. 8 is a diagram illustrating a configuration example according to the embodiment of the invention where a single distance sensor is swung.

The invention is not limited to the above-mentioned embodiment, but can be appropriately modified in various forms without departing from the gist thereof. In the above-mentioned embodiment, a stepped portion, an obstacle, and the like may be detected using a single distance sensor 5. The autonomous moving object 1 is provided with a swing unit (a specific example of the swinging unit) 8 swinging the distance sensor 5 at a predetermined swing angle in the up-down direction in response to a control signal from the controller 7 (FIG. 8).

The distance sensor 5 detects, for example, a measured distance value L1 at a predetermined first swing angle θ1 and a measured distance value L2 at a predetermined second swing angle θ2. The distance sensor 5 detects the measured distance value L1 to the first position P1 on the road surface at the first swing angle θ1 and detects the measured distance value L2 to the second position P2 at the second swing angle θ2. The distance sensor 5 outputs the detected measured distance values L1, L2 to the first and second positions P1, P2 to the determination unit 71 of the controller 7. The subsequent processes thereof are substantially the same as in the configuration using the first and second distance sensors 5, 6 and thus detailed description thereof will not be repeated.

Accordingly, by using a single distance sensor, it is possible to achieve a decrease in cost, to detect a stepped portion and an obstacle of a road surface, and to determine abnormality of the distance sensor 5 with high accuracy. By fixing the distance sensor 5 to the moving object body 2 and causing the moving object body 2 to swing, the distance sensor 5 may swing to the first swing angle $\theta 1$ and the second swing angle $\theta 2$.

Figure 9:
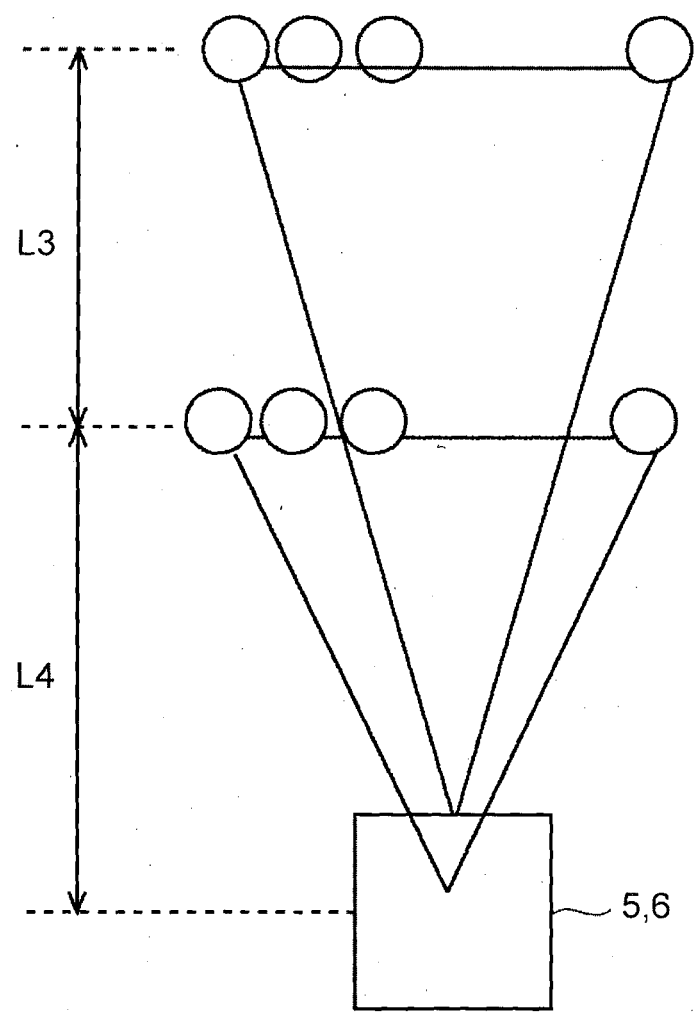
FIG. 9 is a diagram illustrating a configuration example according to the embodiment of the invention where a distance sensor scanning a road surface to detect plural distance values is used.

In the above-mentioned embodiment, a distance sensor detecting a distance value to a point on a road surface is used as the first and second distance sensors 5, 6, but the invention is not limited thereto and a distance sensor scanning a road surface to detect distance values to plural points may be used (FIG. 9).

For example, the first distance sensor 5 detects distance value(1), distance value(2), . . . , distance value(n). The second distance sensor 6 detects distance value(1'), distance value(2'), . . . , distance value(n'). The first distance sensor 5 outputs the average value of the detected distance value(1) to distance value(n) as the distance value L1 to the first position P1 to the determination unit 71 of the controller 7. Similarly, the second distance sensor 6 outputs the average value of the detected distance value(1') to distance value(n') as the distance value L2 to the second position P2 to the determination unit 71 of the controller 7.

The first distance sensor 5 may extract one (for example, a median value) or more (for example, predetermined intervals such as one or two intervals) representative points from the detected distance value(1) to distance value(n) and may output the extracted representative points as the distance value L1 to the first position P1 to the determination unit 71 of the controller 7. Similarly, the second distance sensor 6 may extract one or more representative points from the detected distance value(1') to distance value(n') and may output the extracted representative points as the distance value L2 to the second position P2 to the determination unit 71 of the controller 7. Accordingly, it is possible to determine the abnormality of the distance sensors with higher accuracy using plural distance values detected by the distance sensors 5, 6.

Figure 10:
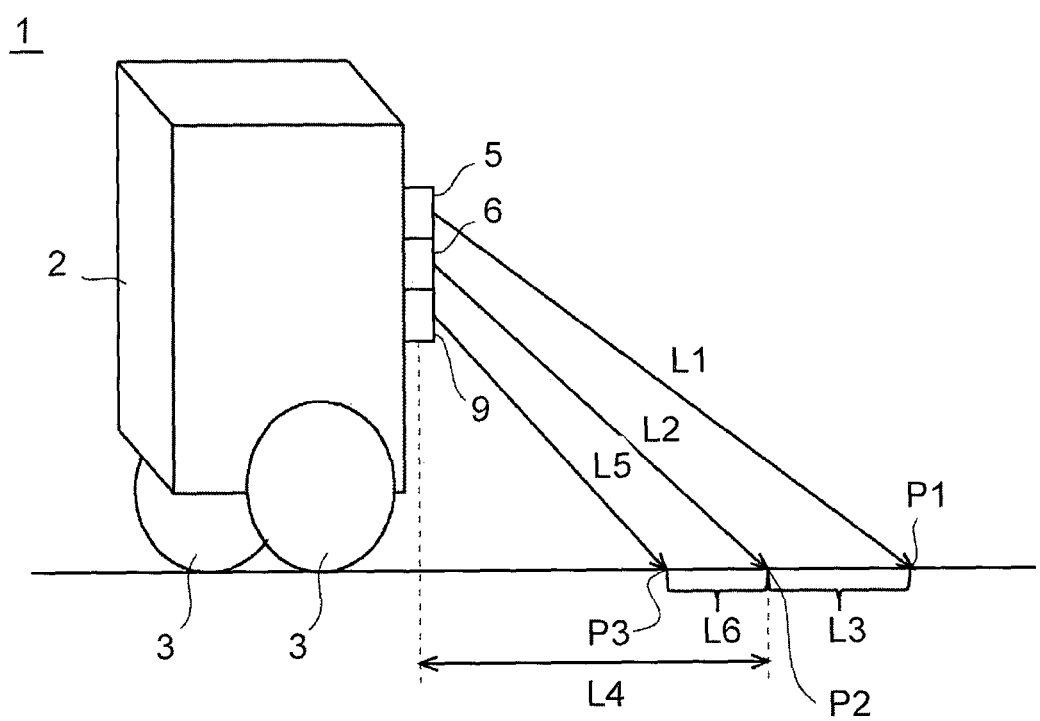
FIG. 10 is a diagram illustrating a configuration example according to the embodiment of the invention where first, second, and third distance sensors are used.

In the above-mentioned embodiment, a third distance sensor 9 may be provided in addition to the first and second distance sensors 5, 6 (FIG. 10). For example, the third distance sensor 9 detects a measured distance value L5 to a third position P3 on the road surface located closer to the autonomous moving object than the second position P2 and outputs the detected measured distance value to the determination unit 71 of the controller 7.

The determination unit 71 calculates a differential time between the time when the first comparison value of the first distance sensor is greater than the first threshold value and the time when the second comparison value of the second distance sensor is greater than the second threshold value. The determination unit 71 calculates a first difference between the calculated differential time and a moving time t3 in which the autonomous moving object 1 moves by the distance L3.

The determination unit 71 calculates a differential time between a time when a third comparison value of the third distance sensor 9 is greater than a third threshold value and the time when the second comparison value of the second distance sensor 6 is greater than the second threshold value. The determination unit 71 calculates a second difference between the calculated differential time and a moving time t4 in which the autonomous moving object 1 moves by the distance L6.

When the calculated first difference is equal to or greater than the second predetermined value and the calculated second difference is less than a third predetermined value, the determination unit 71 determines that the first distance sensor 5 is abnormal. On the other hand, when the calculated first difference is less than the second predetermined value and the calculated second difference is equal to or greater than the third predetermined value, the determination unit 71 determines that the third distance sensor 9 is abnormal. When the calculated first difference is equal to or greater than the second predetermined value, the calculated second difference is equal to or greater than the third predetermined value, the determination unit 71 determines that the second distance sensor 6 is abnormal. In this way, the abnormal sensor out of the first to third distance sensors 5, 6, and 9 can be specified. The configuration including three distance sensors is described above, but a configuration including four or more distance sensors may be employed.

In the above-mentioned embodiment, the first and second distance sensors 5, 6 are disposed on the front side of the moving object body 2, but the invention is not limited to this configuration and, for example, a configuration in which plural distance sensors are disposed around the moving object body 2 may be employed.

According to the embodiment of the invention, for example, the determination process which is performed by the determination unit 71 of the controller 7 may be implemented by causing the CPU 71 to execute a computer program.

The program can be supplied to a computer in a state where the program is stored on various types of non-transitory computer readable mediums. The non-transitory computer-readable medium includes various types of tangible storage mediums. Examples of the non-transitory computer-readable medium include a magnetic recording medium (such as a flexible disk, magnetic tape, or a hard disk drive), a magneto-optical recording medium (such as a magneto-optical disc), a CD-ROM (Read Only Memory), a DC-R, a CD-R/W, and a semiconductor memory (such as a mask ROM, a programmable ROM (PROM), erasable PROM (EMPROM), flash ROM, and a random access memory (RAM)).

The program may be supplied to a computer through the use of various types of transitory computer-readable mediums. Examples of the transitory computer-readable medium include electric signals, optical signals, and electromagnetic waves. The transitory computer-readable medium can supply the program to a computer via a wired communication path such as an electrical cable or an optical fiber or a wireless communication path.

In the description of the embodiment of the invention, the "time in which the comparison values of the distance sensors are greater than the threshold value" is described above. This "time" is, for example, a cumulative time from the time point at which the determination routine is started. The start point of the accumulation is not limited thereto and an actual time point may be used. Accordingly, the difference and differential time calculated from this "time" represent a difference between cumulative values or an elapsed time from the time point at which one comparison value is greater than the threshold value to the time point at which the other comparison value is greater than the threshold value.

The invention claimed is:

1. An autonomous moving object comprising:
    at least one distance sensor configured to detect distances to first and second positions located in a moving direction of the autonomous moving object on a road surface; and
    a determination unit configured to calculate a difference between a differential time between a time when the distance value to the first position detected by the at least one distance sensor is greater than a first threshold value and a time when the distance value to the second position is greater than a second threshold value and a moving time in which the autonomous moving object moves between the first and second positions and to determine that the distance sensor is abnormal when the calculated difference is equal to or greater than a predetermined value.

2. The autonomous moving object according to claim 1, wherein the at least one distance sensor includes a first distance sensor detecting the distance to the first position located in the moving direction of the autonomous moving object on the road surface and a second distance sensor detecting the distance to the second position on the road surface located closer to the autonomous moving object than the first position.

3. The autonomous moving object according to claim 1, further comprising a swing unit configured to swing the at least one distance sensor,
    wherein the at least one distance sensor detects the distance to the first position on the road surface and the distance to the second position on the road surface located closer to the autonomous moving object than the first position when swinging.

4. The autonomous moving object according to claim 1, wherein the determination unit is configured to calculate a first comparison value which is obtained by comparing the distance value to the first position detected by the at least one distance sensor with a preliminarily-calculated distance value to the first position and a second comparison value which is obtained by comparing the distance value to the second position detected by the at least one distance sensor with a preliminarily-calculated distance value to the second position, to calculate a differential time between a time when the first comparison value is greater than the first threshold value and a time when the second comparison value is greater than the second threshold value, and to determine whether the at least one distance sensor is abnormal based on the calculated differential time.

5. The autonomous moving object according to claim 1, wherein the at least one distance sensor includes a first distance sensor detecting the distance to the first position located in the moving direction of the autonomous moving object on the road surface, a second distance sensor detecting the distance to the second position on the road surface located closer to the autonomous moving object than the first position, and a third distance sensor detecting the distance to a third position on the road surface located closer to the autonomous moving object than the second position, and
    wherein the determination unit is configured to calculate a differential time between a time when the distance value to the first position detected by the first distance sensor is greater than the first threshold value and a time when the distance value to the second position detected by the second distance sensor is greater than the second threshold value, to calculate a differential time between a time when the distance value to the third position detected by the third distance sensor is greater than a third threshold value and the time when the distance value to the second position detected by the second distance sensor is greater than the second threshold value, and to specify one out of the first to third distance sensors in which abnormality occurs based on the calculated differential times.

6. The autonomous moving object according to claim 1, wherein the at least one distance sensor scans a road surface to detect distance values to a plurality of points on the road surface.

7. The autonomous moving object according to claim 1, further comprising a control unit configured to control movement of the autonomous moving object depending on the determination result of the determination unit.

8. The autonomous moving object according to claim 1, further comprising a warning unit configured to give a warning depending on the determination result of the determination unit.

9. An autonomous moving object comprising:
    at least one distance sensor configured to detect distances to first and second positions located in a moving direction of the autonomous moving object on a road surface; and
    processing circuitry configured to calculate a difference between a differential time between a time when the distance value to the first position detected by the at least one distance sensor is greater than a first threshold value and a time when the distance value to the second position is greater than a second threshold value and a moving time in which the autonomous moving object moves between the first and second positions and to determine that the distance sensor is abnormal when the calculated difference is equal to or greater than a predetermined value.

10. The autonomous moving object according to claim 9, wherein the at least one distance sensor includes a first distance sensor detecting the distance to the first position located in the moving direction of the autonomous moving object on the road surface and a second distance sensor detecting the distance to the second position on the road surface located closer to the autonomous moving object than the first position.

11. The autonomous moving object according to claim 9, further comprising a swing to swing the at least one distance sensor,
    wherein the at least one distance sensor detects the distance to the first position on the road surface and the distance to the second position on the road surface located closer to the autonomous moving object than the first position when swinging.

12. The autonomous moving object according to claim 9, wherein the processing circuitry is configured to calculate a first comparison value which is obtained by comparing the distance value to the first position detected by the at least one distance sensor with a preliminarily-calculated distance value to the first position and a second comparison value which is obtained by comparing the distance value to the second position detected by the at least one distance sensor with a preliminarily-calculated distance value to the second position, to calculate a differential time between a time when the first comparison value is greater than the first threshold value and a time when the second comparison value is greater than the second threshold value, and to determine whether the at least one distance sensor is abnormal based on the calculated differential time.

13. The autonomous moving object according to claim 9, wherein the at least one distance sensor includes a first distance sensor detecting the distance to the first position located in the moving direction of the autonomous moving object on the road surface, a second distance sensor detecting the distance to the second position on the road surface located closer to the autonomous moving object than the first position, and a third distance sensor detecting the distance to a third position on the road surface located closer to the autonomous moving object than the second position, and wherein the processing circuitry is configured to calculate a differential time between a time when the distance value to the first position detected by the first distance sensor is greater than the first threshold value and a time when the distance value to the second position detected by the second distance sensor is greater than the second threshold value, to calculate a differential time between a time when the distance value to the third position detected by the third distance sensor is greater than a third threshold value and the time when the distance value to the second position detected by the second distance sensor is greater than the second threshold value, and to specify one out of the first to third distance sensors in which abnormality occurs based on the calculated differential times.

14. The autonomous moving object according to claim 9, wherein the at least one distance sensor scans a road surface to detect distance values to a plurality of points on the road surface.

15. The autonomous moving object according to claim 9, wherein the processing circuitry is configured to control movement of the autonomous moving object depending on the determination result of the processing circuitry.

16. The autonomous moving object according to claim 9, wherein the processing circuitry is configured to give a warning depending on the determination result of the processing circuitry.

* * * * *